(No Model.)

E. U. MOORE.
NUT LOCK.

No. 501,590.  Patented July 18, 1893.

Witnesses

Inventor
E. U. Moore,
By his Attorneys,

UNITED STATES PATENT OFFICE.

EDWARD U. MOORE, OF CHAIRES, FLORIDA.

NUT-LOCK.

SPECIFICATION forming part of Letters Patent No. 501,590, dated July 18, 1893.

Application filed January 25, 1893. Serial No. 459,706. (No model.)

*To all whom it may concern:*

Be it known that I, EDWARD U. MOORE, a citizen of the United States, residing at Chaires, in the county of Leon and State of Florida, have invented a new and useful Nut-Lock, of which the following is a specification.

The invention relates to improvements in nut locks.

The object of the present invention is to simplify and improve the construction of nut locks, and provide one particularly adapted for rail joints, and capable of being readily applied to the nuts thereof and of securely locking the same.

The invention consists in the construction and novel combination and arrangement of parts hereinafter fully described, illustrated in the accompanying drawings and pointed out in the claim hereto appended.

Figure 1:
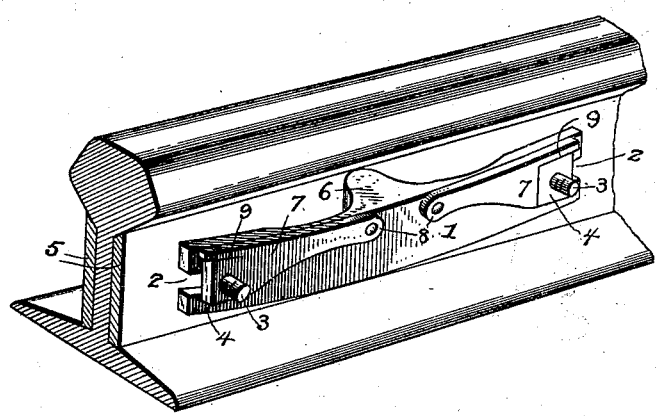
Figure 2:
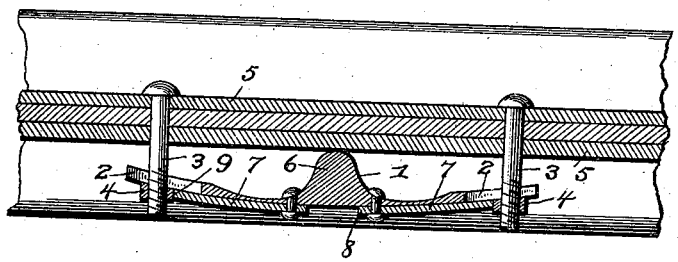
Figure 3:
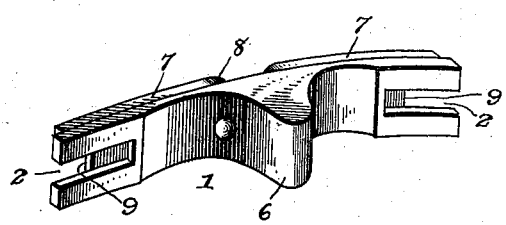

In the drawings—Figure 1 is a perspective view of a nut lock constructed in accordance with this invention and shown applied to a rail joint. Fig. 2 is a horizontal sectional view. Fig. 3 is a detail perspective view of the resilient bar.

Like numerals of reference indicate corresponding parts in all the figures of the drawings.

1 designates a resilient bar provided at each end with a bifurcation 2, adapted to receive bolts 3 of a rail joint, and designed to be interposed between nuts 4 and a fish-plate 5 of a rail joint, and to engage the inner faces of the nuts. The resilient plate 1 is provided on its inner face with an inwardly extending swell or enlargement 6, adapted to form a bearing or fulcrum for the resilient plate to offset it from the fish-plate to permit its ends to exert spring pressure on the inner faces of the nuts 4. As the nuts are screwed up the resilient ends of the plate 1 are forced inward and the tension of the resilient plate is increased to securely clamp the nuts. The nuts are held against turning by latches 7, arranged on the outer face of the resilient plate and having their inner ends 8 pivoted thereto, and provided in the lower portions of their outer ends with rectangular recesses 9 adapted to receive the upper portions of the nuts.
The latches are adapted to be swung up out of engagement with the nuts, and to be turned down into such engagement, and their gravity holds them in engagement, whereby the nuts are securely locked against turning.

It will be seen that a simple, inexpensive and efficient nut lock is provided, capable of securely locking the nuts of a rail joint.

Changes in the form, proportion and the minor details of construction may be resorted to without departing from the principle or sacrificing any of the advantages of the invention.

What I claim is—

In a nut lock, the combination of a resilient bar having its ends bifurcated to straddle the bolts beneath the nuts of a rail joint to bring the nuts on its outer face, and provided intermediate of its ends on its inner face with an inwardly projecting convex enlargement or swell, having a rounded engaging end and forming a bearing or fulcrum for the bar and interposed between the same and the fish-plate of a rail joint to form springs of the end portions of the bar, said end portions being recessed and reduced at their inner faces adjacent to the enlargement or swell to impart resiliency to the bar, and latches for engaging the nuts, substantially as described.

In testimony that I claim the foregoing as my own I have hereto affixed my signature in the presence of two witnesses.

EDWARD U. MOORE.

Witnesses:
N. E. BASSETT,
C. T. HANCOCK.